Sept. 12, 1933. U. PESTALOZZA 1,926,702
METHOD OF CONCENTRATING AQUEOUS DISPERSIONS OF RUBBER AND THE LIKE
Filed Aug. 12, 1931
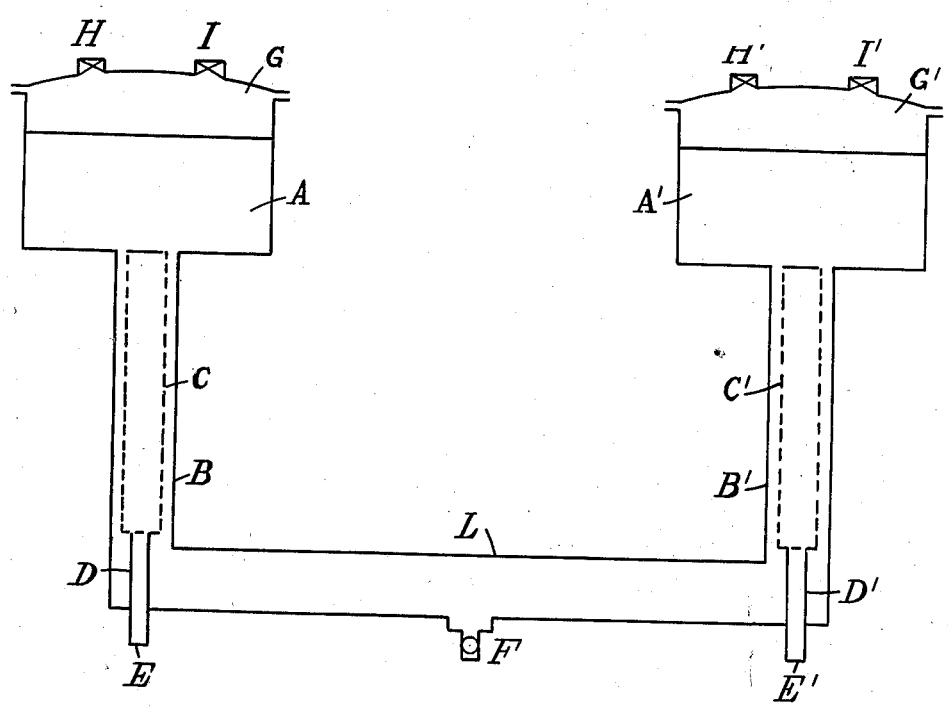
INVENTOR.

Patented Sept. 12, 1933

1,926,702

UNITED STATES PATENT OFFICE 1,926,702

METHOD OF CONCENTRATING AQUEOUS DISPERSIONS OF RUBBER AND THE LIKE

Ugo Pestalozza, Milan, Italy, assignor to Societa Italiana Pirelli, Milan, Italy Application August 12, 1931, Serial No. 556,555, and in Great Britain November 8, 1929

4 Claims. (Cl. 210—182)

This invention consists in an improved method of concentrating aqueous dispersions of rubber and the like.

Natural rubber latex as it comes from the plantations usually contains from 30–36 per cent. of dry rubber in suspension, the remainder of the material consisting of water containing in solution small quantities of mineral salts, proteins and other natural organic substances, and substances which may have been added to the latex to prevent coagulation, for example, alkaline reagents, usually ammonia.

Many methods have been proposed for concentrating latex, by direct evaporation of the water; by the addition of substances which cause the latex to cream and then separating the concentrated upper layer; and by mechanical means, for example, centrifugal action.

It has further been proposed to concentrate latex by filtering off the serum through membranes or fabrics or ultra-filters, and in particular through filters of unglazed earthenware in an attempt to turn to account the absorptive properties of such material. Thus, if a hollow form of porous earthenware be immersed in latex, the surface of the form becomes covered after a time with a layer of concentrated and thick latex, the rubber particles of which on contact with water at once return into normal suspension. This process, however, has not proved of practical application within our experience, by reason of the fact that the layer of deposited concentrated latex tends to pass into the condition of an irreversible coagulum on subjection to any mechanical treatment, even when light.

In order to facilitate filtration it has also been proposed to stir the fluid while filtering by a stirrer set at such an appropriate distance from the filtering surface as to limit the thickness thereon of the accumulating deposit to a degree which does not unduly impede the passage of the fluid.

According to the present invention, a method of dewatering aqueous colloidal dispersions of rubber or the like, for example, rubber latex, consists in repeatedly forcing a stream of the dispersion across a filter surface at such a speed relatively thereto as to prevent clogging of the surface by accumulation thereon of disperse phase from the dispersion.

According to a preferred form of the invention, the improved method of de-watering rubber latex and the like consists in alternately forcing said body in a stream first in one direction and then in the reverse direction across a filter surface at such a velocity relatively thereto as continuously to deturge the surface of disperse phase tending to accumulate thereon from the dispersion, the repeated passage of the dispersion across the filter being continued until the desired degree of de-watering has been attained.

The invention will hereinafter be described with reference to the accompanying drawing, which illustrates diagrammatically one method of carrying the invention into effect.

Referring to the drawing, A, A' represents two reservoirs arranged in communication with one another by means of a channel, for example, of U shape, composed of two vertically disposed conduits B, B', joined by a horizontally arranged pipe L. The horizontal pipe L is provided with a discharge valve F. Arranged within each vertically disposed conduit B, B' is a cylindrical filter C, C' composed of unglazed earthenware. The filters C, C' are constructed of such a diameter that the annular space between the outer surfaces of each filter and the inner surface of the corresponding vertically disposed conduit B, B' is of approximately 3–4 millimetres.

The filters C, C' are connected at their lower ends to discharge openings E, E' by means of outlet pipes D, D'.

Each of the reservoirs A, A' is provided with an airtight cover G, G', which carry valves H, I and H' and I'. Each of the valves I, H' is arranged in communication with a source of air supply under pressure, whilst each of the valves H, I' is arranged to be placed in communication with the atmosphere. The valves H, I and H', I' are arranged to be actuated by mechanism operable to open alternately the valves I, I' and the valves H, H'.

The operation of the apparatus is as follows:—

The reservoirs A, A' are filled with, for example, rubber-latex of normal rubber content until the level of the liquid reaches approximately the level indicated in the drawing. The air-tight covers are then placed in position upon the reservoirs, and the valve mechanism set in operation. If, for example, valves H, H' are closed, and the valves I, I' are open, air enters the reservoir A by means of the valve I and forces the latex into the reservoir A', the air in the reservoir A' escaping through the valve I'. After a predetermined period, the valves I and I' are closed and the valves H, H' opened, whereupon the latex is moved in the reverse direction.

By this method the latex is moved periodically over the surfaces of the filtering devices C, C' in reverse directions. By regulating the pressure of air, the latex may be moved at the required speed over the surfaces of the devices C, C' so as to ensure that the surfaces are maintained substantially free of deposited rubber particles.

It is preferable to arrange the valve mechanism so that any one reservoir is not completely emptied before the liquid is moved in the reverse direction.

The periodic movement of the latex in opposite directions continues until the desired concentration is obtained, the serum which constitutes the filtrate passing during this operation through the outlet pipes D, D' to the discharge openings, E, E'.

By means of the method and apparatus hereinbefore set forth, it is possible conveniently to obtain latex in a high degree of concentration by filtration, in virtue of the fact that the movement of the liquid and the periodic change of direction of the dispersion has a scouring action which removes particles of rubber which have a tendency to accumulate upon the surface of the filter and so to clog the pores.

The filtration may be increased by augmenting the difference of pressure on the two sides of a filter, for example, by placing the openings E, E' under the influence of a suction device.

It may be found in the operation of the apparatus described that after the latex, for example, has reached a certain degree of concentration, there is a tendency to form a rubber layer on the upper parts of the walls of the reservoirs due to the preservative, if volatile, being carried away as vapour with the air supply. This defect may be avoided by placing in the reservoirs air bags which are expanded and collapsed alternately. By this means the air which effects the movement of the latex is kept out of contact therewith.

It will be appreciated that the shape of the filtering surfaces and the disposition of the same may be varied, for example, the surfaces may be flat and the dispersion may be caused to flow over said surfaces by any desired means which will ensure that the speed of the liquid is sufficient to prevent any substantial deposition of the disperse phase upon the filtering surfaces and consequent clogging of the pores of the filter.

The method and apparatus hereinbefore described are capable of producing latex containing 65-70 per cent. of dry rubber at normal temperature, and if the temperature be raised, the speed of filtration may be still further increased. Internal or external heating may be employed as desired.

The invention may be applied to dispersions such as those of gutta-percha and balata, and as well as to the concentration of natural rubber latex to aqueous dispersions of artificial and of vulcanized rubber. There may be added to such dispersions, fillers, vulcanizing agents, dyes, protective colloids, preservatives, and other addenda usual in the manufacture of rubber and the like in order to obtain dispersions of high rubber content containing desired proportions of the above ingredients. In concentration according to this invention tendency to coagulation is much reduced. It has been found as a rule that if there be initially added to the dispersion just sufficient of anti-coagulant to confer stability at the final concentration sought, further addition of anti-coagulant—generally undesirable—is not necessary at any subsequent stage of the process.

What I claim is:—

1. A method of de-watering to a predetermined degree a body of aqueous colloidal dispersion of rubber or the like, which consists in alternately forcing said body in a stream first in one direction and then in the reverse direction across a filter surface at such a velocity relatively thereto as continuously to deturge the surface of disperse phase tending to accumulate thereon from the dispersion, the repeated passage of the dispersion across the filter being continued until the desired degree of de-watering has been attained.

2. A method of de-watering to a predetermined degree a body of aqueous colloidal dispersion of rubber or the like, which consists in alternately forcing said body of dispersion in a thin film first in one direction and then in the reverse direction across a filter surface at such a speed relatively thereto as continuously to deturge the surface from the accumulation thereon of disperse phase from the dispersion, the repeated passage of the body of dispersion across the filter surface being continued until the required degree of de-watering has been attained.

3. A method of de-watering to a predetermined degree a body of aqueous colloidal dispersion of rubber or the like, which consists in alternately forcing said body in a stream first in one direction and then in the reverse direction across a filter surface at such a velocity relatively thereto as continuously to deturge the surface of disperse phase tending to accumulate thereon from the dispersion, the repeated passage of the dispersion across the filter being continued until the desired degree of de-watering has been attained, and a pressure difference being maintained on the two sides of the filter surface in the direction to accentuate the flow of dispersing medium therethrough.

4. A method of de-watering to a predetermined degree a body of aqueous colloidal dispersion of rubber or the like, which consists in alternately forcing said body of dispersion in a thin film first in one direction and then in the reverse direction across a filter surface at such a speed relatively thereto as continuously to deturge the surface from the accumulation thereon of disperse phase from the dispersion, the repeated passage of the body of dispersion across the filter surface being continued until the required degree of de-watering has been attained, and a pressure difference being maintained on the two sides of the filter surface in the direction to accentuate the flow of dispersing medium therethrough.

UGO PESTALOZZA.